(12) United States Patent
Roper

(10) Patent No.: US 10,221,973 B2
(45) Date of Patent: Mar. 5, 2019

(54) ROTATABLE PIPE ADAPTER

(71) Applicant: John O. Roper, Fountain Inn, SC (US)

(72) Inventor: John O. Roper, Fountain Inn, SC (US)

( * ) Notice: Subject to any disclaimer, the term of this patent is extended or adjusted under 35 U.S.C. 154(b) by 45 days.

(21) Appl. No.: 15/255,321

(22) Filed: Sep. 2, 2016

(65) Prior Publication Data

US 2017/0343141 A1   Nov. 30, 2017

Related U.S. Application Data

(63) Continuation-in-part of application No. 15/166,466, filed on May 27, 2016.

(51) Int. Cl.

| *F16L 27/08* | (2006.01) |
|---|---|
| *F16L 21/04* | (2006.01) |
| *F16L 21/08* | (2006.01) |
| *F16L 47/02* | (2006.01) |
| *F16L 47/18* | (2006.01) |
| *B29L 31/24* | (2006.01) |
| *B29C 65/08* | (2006.01) |
| *B29C 65/48* | (2006.01) |
| *B29C 65/50* | (2006.01) |

(Continued)

(52) U.S. Cl.
CPC ........... *F16L 27/0804* (2013.01); *F16L 21/04* (2013.01); *F16L 21/08* (2013.01); *F16L 27/0816* (2013.01); *F16L 27/0845* (2013.01); *F16L 47/02* (2013.01); *F16L 47/18* (2013.01); *B29C 65/02* (2013.01); *B29C 65/08* (2013.01); *B29C 65/48* (2013.01); *B29C 65/483* (2013.01); *B29C 65/5057* (2013.01); *B29C 65/58* (2013.01); *B29C 66/1222* (2013.01); *B29C 66/1224* (2013.01); *B29C 66/1312* (2013.01); *B29C 66/5221* (2013.01); *B29C 66/5229* (2013.01); *B29C 66/52231* (2013.01); *B29C 66/52292* (2013.01); *B29C 66/55* (2013.01); *B29C 66/71* (2013.01); *B29C 66/735* (2013.01); *B29L 2031/24* (2013.01); *B29L 2031/243* (2013.01)

(58) Field of Classification Search
CPC . F16L 17/02; F16L 17/06; F16L 21/02; F16L 21/04; F16L 21/08; F16L 27/0849; F16L 27/0804; F16L 19/053
USPC ......... 285/98, 272, 273, 275, 278, 280, 282, 285/148.15, 148.4, 121.6, 121.7, 147.1
See application file for complete search history.

(56) References Cited

U.S. PATENT DOCUMENTS

| 3,606,402 | A | 9/1971 | Medney |
|---|---|---|---|
| 3,722,926 | A | 3/1973 | Fukushima |

(Continued)

OTHER PUBLICATIONS

Lasco Fittings, Inc., Irrigation Products Catalogs; www.lascofittings.com.

*Primary Examiner* — Aaron M Dunwoody
(74) *Attorney, Agent, or Firm* — JK Intellectual Property Law, PA

(57) ABSTRACT

A pipe adapter includes a first tubular element, a second tubular element, and an annular securing member disposed around and fixed to a second portion of the first tubular element. The annular securing member has a flange portion that contacts and secures the second tubular element axially relative to the first tubular element while also allowing the second tubular element to rotate relative to the first tubular element and the annular securing member. An annular sealing member is located around the first portion of the second tubular element to provide an axial seal along the adapter.

10 Claims, 5 Drawing Sheets

(51) Int. Cl.
    *B29C 65/58*    (2006.01)
    *B29C 65/00*    (2006.01)
    *B29C 65/02*    (2006.01)

(56) References Cited

U.S. PATENT DOCUMENTS

| | | |
|---|---|---|
| 3,764,170 A | 10/1973 | Brown |
| 3,916,502 A | 11/1975 | Bagnulo |
| 4,128,127 A * | 12/1978 | Taylor .................... E21B 17/05 |
| | | 166/105 |
| 4,611,834 A | 9/1986 | Rabinovich |
| 4,905,766 A | 3/1990 | Dietz et al. |
| 5,486,024 A | 1/1996 | Dierdorf |
| 5,813,705 A | 9/1998 | Dole |
| 6,343,813 B1 | 2/2002 | Olson et al. |
| 6,508,492 B2 | 1/2003 | Nixon et al. |
| 6,709,020 B2 | 3/2004 | Workman et al. |
| 6,899,355 B2 | 5/2005 | Klein et al. |
| 7,108,295 B1 | 9/2006 | Zarynow |
| 7,717,473 B1 * | 5/2010 | Zhang .................... F16L 27/026 |
| | | 285/121.1 |
| 8,047,579 B2 | 11/2011 | Taillon |
| 8,746,747 B2 | 6/2014 | McPherson |
| 8,827,319 B2 | 9/2014 | Chung |
| 2006/0191623 A1 | 8/2006 | Lutz et al. |
| 2008/0012307 A1 | 1/2008 | Taillon |
| 2008/0106092 A1 | 5/2008 | Klein |
| 2008/0106095 A1 | 5/2008 | Harris et al. |
| 2009/0014121 A1 | 1/2009 | McPherson |
| 2010/0008712 A1 | 1/2010 | Sitz et al. |
| 2012/0326440 A1 | 12/2012 | Weinhold |
| 2013/0214531 A1 | 8/2013 | McAllister et al. |
| 2015/0042087 A1 | 2/2015 | Zaffetti et al. |
| 2015/0176732 A1 | 6/2015 | Courpet et al. |
| 2016/0010775 A1 | 1/2016 | Morroney |

\* cited by examiner

ROTATABLE PIPE ADAPTER

CROSS-REFERENCE TO RELATED APPLICATIONS

The present application is a continuation-in-part application of and claims priority to co-pending U.S. patent application Ser. No. 15/166,466, filed May 27, 2016, which application is also incorporated by reference herein.

TECHNICAL FIELD

The present disclosure relates generally to an adapter for joining pipes, wherein the joined pipes are rotatable relative to one another after attachment to the adapter.

BACKGROUND

Piping has been used to transmit liquids such as drinking water, waste water, irrigation water, fire sprinkler water, sewage, and chemicals to name but a few. Piping has also been used to transmit gases, and as a conduit for to holding electrical wiring. Often such piping is made of a plastic, such as Polyvinyl Chloride (PVC), Chlorinated Polyvinyl Chloride (CPVC), Acrylonitrile Butadiene Styrene (ABS), Polyethylene (PE), Cross-Linked Polyethylene (PEX), or others. Piping may be installed in an environment such as within a trench in the earth, within the walls or ceiling of a building, between two already fixed but not necessarily aligned external elements, etc. Due to the general rigidity of such piping, care must be taken to accurately design, lay out and connect piping. Because adjacent pieces of piping and their fittings are often connected permanently (e.g., via an epoxy or the like), a technician connecting such elements has little flexibility in installation path and only one chance to make each connection correctly. Further, in some situations, the intended installation environment differs from the planned layout, for example, if a trench is not accurately dug or is dug differently than planned due to rocks or other unforeseen subterranean impediments, if a building is not constructed exactly to plan or plans are changed after piping layout is completed, etc. Thus, for various reasons, it can be difficult and time consuming to develop and install various types of piping systems. Also, in seismic zones, rigid pipe connections are subject to failure in case of an earthquake.

Accordingly, improvements would be welcome to piping systems that provide more flexibility in creating a layout or to a technician during installation, more reliability in case of seismic activity and/or addressing one or more drawbacks of current systems, or any other issues.

SUMMARY

According to certain aspects of the disclosure, a pipe adapter includes a first tubular element defining a central axis and having a first portion, a second portion axially adjacent the first portion, and a radially-extending shoulder between the first portion and second portion, the first portion having an inner diameter and an outer diameter, the second portion having an inner diameter larger than the first portion inner diameter and an outer diameter larger than the first portion inner diameter. A second tubular element defines a central axis and has a first portion and a second portion axially adjacent the first portion, the first portion of the second tubular element having an inner diameter and an outer diameter just smaller than the inner diameter of the second portion of the first tubular element, the second tubular element first portion having a distal end that abuts the shoulder and having a radially extending stop. An annular sealing member is located between the first portion of the second tubular element and the second portion of the first tubular element and providing an axial seal therebetween. An annular securing member is disposed around and fixed to the second portion of the first tubular element for movement therewith, the annular securing member having a flange portion contacting the stop to secure the second tubular element axially relative to the first tubular element while also allowing the second tubular element to rotate relative to the first tubular element and annular securing member. Various options and modifications are possible.

According to certain other aspects of the disclosure, a pipe adapter includes a first tubular element having a first portion and a second portion axially adjacent the first portion, the second portion defining a socket. A second tubular element has a first portion and a second portion axially adjacent the first portion, the first portion defining a distal end sized for insertion into the socket and having a radially extending stop. An annular sealing member is located between the first portion of the second tubular element and the second portion of the first tubular element and providing an axial seal therebetween. An annular securing member is disposed around and fixed to the second portion of the first tubular element for movement therewith, the annular securing member having a flange portion contacting the stop to secure the second tubular element axially relative to the first tubular element while also allowing the second tubular element to rotate relative to the first tubular element and annular securing member. Various options and modifications are possible.

According to other aspects of the disclosure, a pipe adapter includes a first tubular element defining a central axis and having a first portion, a second portion axially adjacent the first portion, and a radially-extending shoulder at the distal end of the second portion, the first portion having an inner diameter and an outer diameter, the second portion having an inner diameter substantially equal to the first portion inner diameter and an outer diameter larger than the first portion outer diameter. A second tubular element defines a central axis and having a first portion and a second portion axially adjacent the first portion, the first portion of the second tubular element having an inner diameter substantially equal to the inner diameter of the second portion of the first tubular member and an outer diameter substantially equal to the outer diameter of the second portion of the first tubular element, the second tubular element first portion having a distal end that abuts the shoulder and having a radially extending stop. An annular securing member is disposed around and fixed to the second portion of the first tubular element for movement therewith, the annular securing member having a flange portion contacting the stop to secure the second tubular element axially relative to the first tubular element while also allowing the second tubular element to rotate relative to the first tubular element and annular securing member. An annular sealing member is located between the first portion of the second tubular element and annular securing member and providing an axial seal therebetween. Various options and modifications are possible.

According to other aspects of the disclosure, a pipe adapter includes a first tubular element having a first portion and a second portion axially adjacent the first portion, the second portion defining a distal end. A second tubular element has a first portion and a second portion axially adjacent the first portion, the first portion defining a distal end sized abutting the distal end of the first tubular element and having a radially extending stop. An annular securing member is disposed around and fixed to the second portion of the first tubular element for movement therewith, the annular securing member having a flange portion contacting the stop to secure the second tubular element axially relative to the first tubular element while also allowing the second tubular element to rotate relative to the first tubular element and annular securing member. An annular sealing member is located between the first portion of the second tubular element and the annular securing member and providing an axial seal therebetween. Various options and modifications are possible.

BRIEF DESCRIPTION OF THE DRAWINGS

More details of the present disclosure are set forth in the drawings.

DETAILED DESCRIPTION

Figure 1:
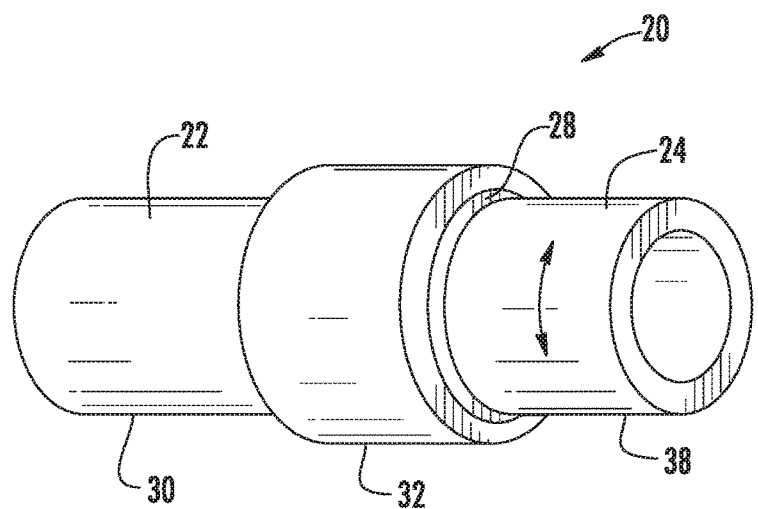
FIG. 1 is an isometric view of a first embodiment of a pipe adapter according to certain aspects of the disclosure.
Figure 2:
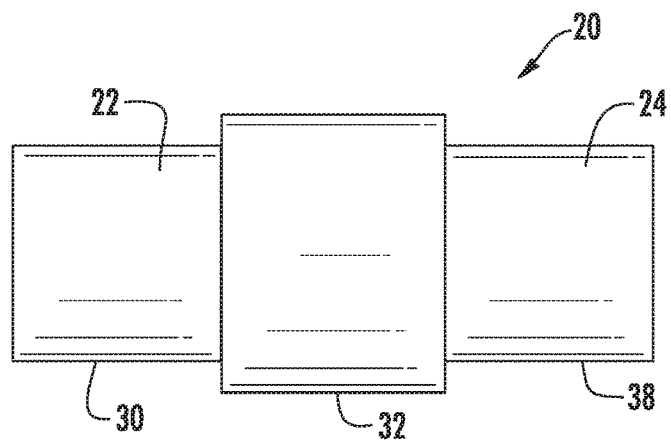
FIG. 2 is a side view of the pipe adapter of FIG. 1.
Figure 3:
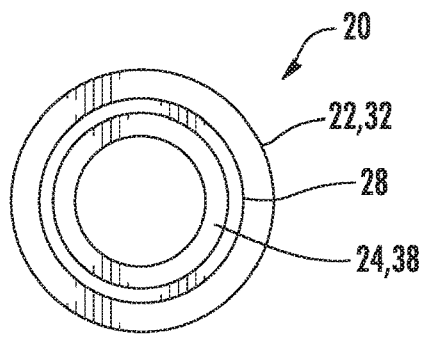
FIG. 3 is an end view of the pipe adapter of FIG. 1.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

Generally speaking, FIGS. 1-14 depict examples of pipe adapters that can be used to connect various types of piping or connectors while allowing relative rotation. The piping, like that in Applicant's U.S. patent application Ser. No. 15/166,466, filed May 27, 2016, can be used with liquids, gases and electrical wiring or any other suitable application. A first embodiment of such a pipe adapter 20 is shown in FIGS. 1-6. As illustrated, pipe adapter 20 includes first tubular element 22, second tubular element 24, annular sealing member 26 and annular securing member 28. Components 22, 24 and 28 may be formed of PVC material, but plastics such as CPVC, ABS, PE, PEX and still others could also be employed. Annular sealing member 26 is preferably an O-ring formed of a rubber or thermoplastic such as Nitrile Butadiene Rubber (NBR), Hydrogenated Nitrile Butadiene Rubber (HNBR), Carboxylated Nitrile Butadiene Rubber (XNBR), Silicone Rubber (SIR), Fluoroelastomer (FKM), etc.

The choice of material for components 22-28 can be readily selected by one skilled in the art depending on the characteristics (e.g., temperatures, pressures, environment, chemical exposure, etc.) of the application in which the pipe adapter will be deployed. It should therefore be understood that the present disclosure is not limited to particular examples of materials noted above.

As illustrated, first tubular element 22 has a first portion 30 and a second portion 32 adjacent each other along axis 34. First portion 30 has an inner diameter $d_1$ and an outer diameter $d_2$. Second portion 32 has an inner diameter $d_3$ and an outer diameter $d_4$ both larger than their corresponding inner and outer diameters $d_1$, $d_2$ of first portion 30. Second portion 32 defines a socket 35 bounded by shoulder 40 and the walls of inner diameter $d_3$.

Figure 4:
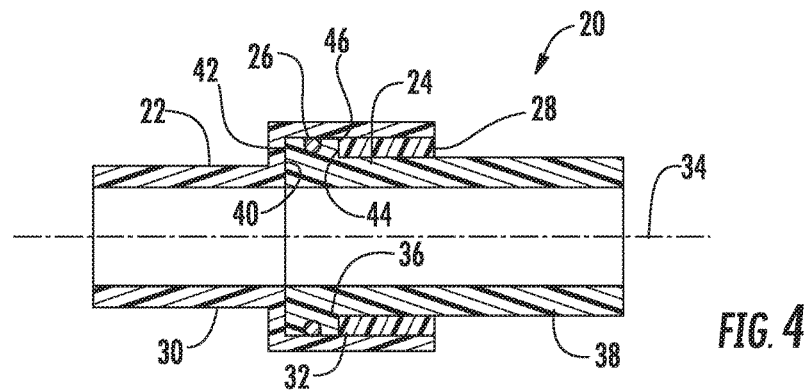
FIG. 4 is a cross-sectional view of the pipe adapter of FIG. 1 taken along line 4-4 in FIG. 1.
Figure 5:
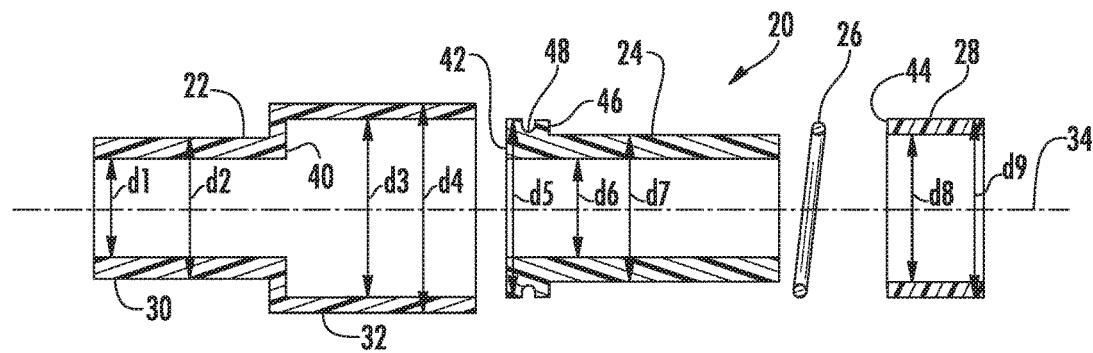
FIG. 5 is an exploded version of the cross-sectional view of FIG. 4.

Second tubular element 24 has a first portion 36 and a second portion 38 axially adjacent the first portion. First portion 36 defines a distal end 42 sized for insertion into socket 35. First portion 36 also has a radially extending stop 46 spaced from distal end 42. Distal end 42 has a diameter $d_5$ just smaller than $d_3$ of socket 35 so that the first and second tubular elements 22,24 are readily slid together along axis 34 while generally maintaining alignment due to the mating cylindrical shapes at the $d_3/d_5$ interface. Thus, during assembly of pipe adapter 20, as shown in FIGS. 4 and 5, first portion 36 of second tubular element 24 is slid into second portion 32 (i.e., socket 35) of first tubular element 22 until distal end 42 hits shoulder 40.

Annular sealing member 26 is located between first portion 36 of second tubular element 24 and second portion 32 of first tubular element 22. Annular sealing member 26 provides a seal preventing axial flow along the $d_3/d_5$ interface between tubular elements 22,24. A channel may be provided in one or both of the d/3/d5 surfaces to receive annular sealing member 26. As illustrated, one such channel 48 is provided in first portion 36 of second tubular element. If desired, additional sealing members could also or alternatively be provided along the d/3/d5 interface or along the shoulder 40/distal end 42 interface to seal between first and second tubular elements 22,24.

Annular securing member 28 is has an internal diameter $d_8$ and an external diameter $d_9$. Internal diameter $d_8$ is sized just larger than external diameter $d_7$ of second tubular element 24. External diameter $d_9$ of annular securing member 28 is sized just smaller than internal diameter $d_3$ of second portion 32 first tubular element 22. Therefore, after the first and second tubular elements 22,24 are slid together (with annular sealing member 26 in place) annular securing member 28 can be slid onto second tubular element 24 within socket 35. Annular securing member 28 has a distal end 44 that abuts stop 46 on first portion 36 of second tubular element 24 when annular securing member 28 is fully installed. It may be preferable, as shown, that end 45 of annular securing element 28 and end 47 of second portion 32 of first tubular element 22 are radially aligned after insertion (see FIGS. 1, 2 and 4). At this point, each of first tubular element 22, second tubular element 24 and annular securing member 28 are all relatively rotatable relative to each other around axis 34.

After assembly, annular securing member 28 is fixed within socket 35 of first tubular element 22, for example, by at least one of an adhesive, an epoxy, hot welding, ultrasonic welding, mating threads, and/or a snap fit. Annular securing member 28 is preferably not fixed to second tubular element 24. After assembly and fixing of annular securing member 28 within socket 35, distal end 44 of annular securing member 28 contacts stop 46 on second tubular element 24 to secure second tubular element 24 axially relative to first tubular element 22 while also allowing second tubular element 24 to rotate relative to first tubular element 22 and annular securing member 28.

Figure 6:
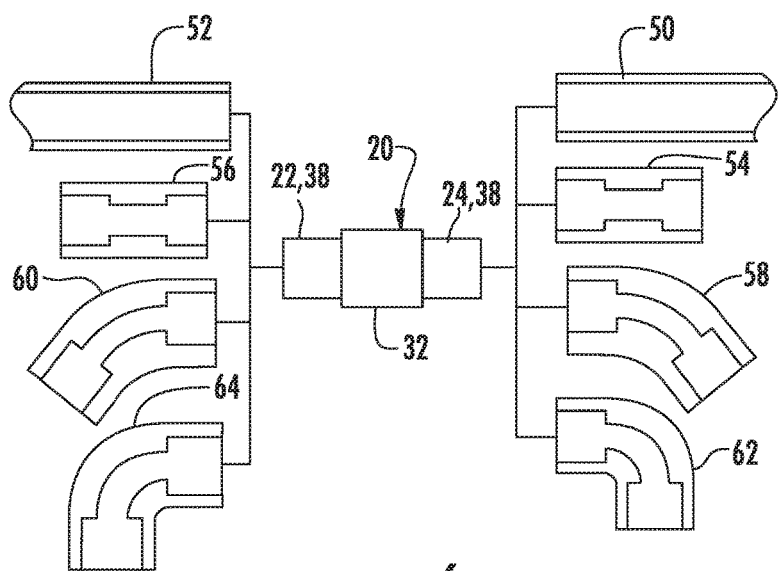
FIG. 6 is a diagrammatic view showing possible connections to the pipe adapter of FIG. 1.

Adapter 20 can be used to connect various types of pipes and connectors, as schematically illustrated in FIG. 6. For example, pipes 50, 52, straight connectors 54, 56, angled connectors 58,60, right-angled connectors 62,64, and other piping elements can be attached to portions 30 and 38. Adapter 20 has particular utility where one or two angled connectors are employed, or where straight connectors or pipes are connected to pipes angled further on. In such case the rotatability of the element attached to portion 38 relative to the element attached to portion 30 allows for some adjustability. Thus, the additional elements can be fixed to portions 30 and 38, while leaving them relatively rotatable while further elements are attached along the layout. If a rigid layout is desired, after the layout is completed, second tubular element 24 can be permanently fixed (e.g., by an epoxy, weld or other ways) to annular securing element 28. Alternatively, if desired, the rotatability may be maintained permanently by not fixing together such parts.

Figure 7:
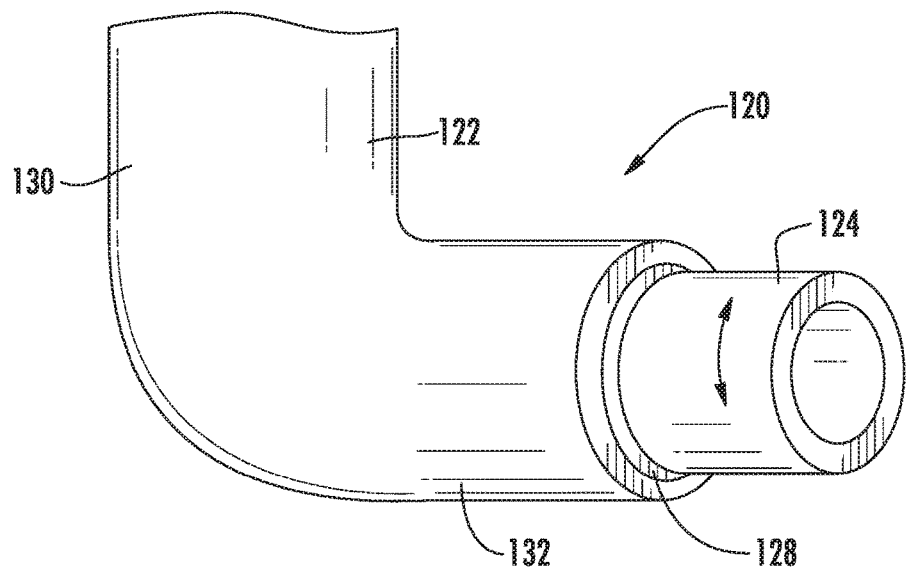
FIG. 7 is an isometric view of a second embodiment of a pipe adapter according to certain aspects of the disclosure.
Figure 8:
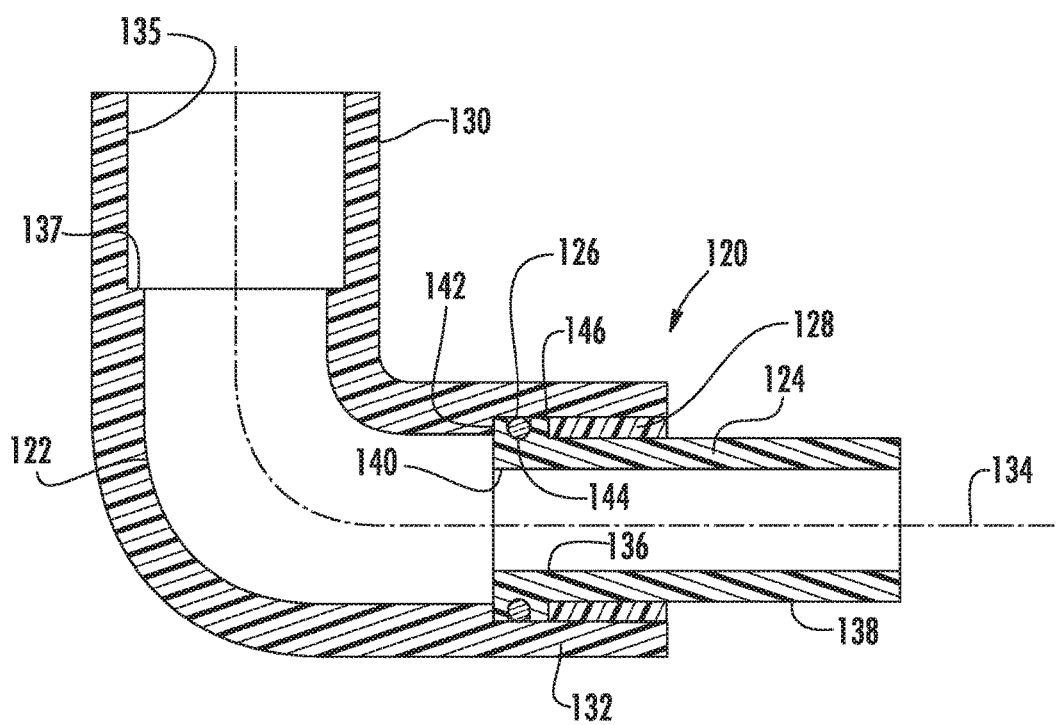
FIG. 8 is a cross-sectional view of the pipe adapter of FIG. 7 taken along line 8-8 in FIG. 7.

FIGS. 7 and 8 depict another embodiment of a pipe adaptor 120 in which like or similar elements are identified with like or similar reference numerals. For brevity, all depicted elements of pipe adaptor 120 are not described herein; please refer to the description above.

Pipe adaptor 120 includes a first tubular element 122, a second tubular element 124, an annular sealing member 126 and an annular securing member 128. The latter three parts are essentially similar to the corresponding parts of pipe adaptor 20 and thus need not be discussed in further detail.

However, first tubular element 122 differs from first tubular element 22 in that element 122 has a first portion 130 formed with a socket 135 having a shoulder 137. Socket 135 is sized for receiving a pipe therein. Alternatively, a second set of elements 124, 1426 and 128 may be inserted into socket 135 in a similar fashion. To provide two elements 124 rotatable relative to element 122.

Note the right angle turn of axis 134 between socket 135 and second portion 138 of second tubular element 124. As illustrated, first tubular element 122 incorporates the structure and functionality of a right-angle connector within the adapter itself. It should be understood that path of axis 134 may be straight (providing a linear connector function) or angled at any desired direction (i.e., 30 degrees, 45 degrees, 60 degrees, 90 degrees, etc.) to which the first tubular element 122 can be manufactured. Thus, pipe adapter 120 provides the benefits of pipe adapter 20 above with respect to the rotational adjustability of parts. Pipe adapter 120 also provides a compact assembly including an on-board socket so that, for example, a connector such as connectors 54-62 with two sockets need not also be employed with adapter 20 when a socket is desired at a location adjacent the adapter.

Figure 9:
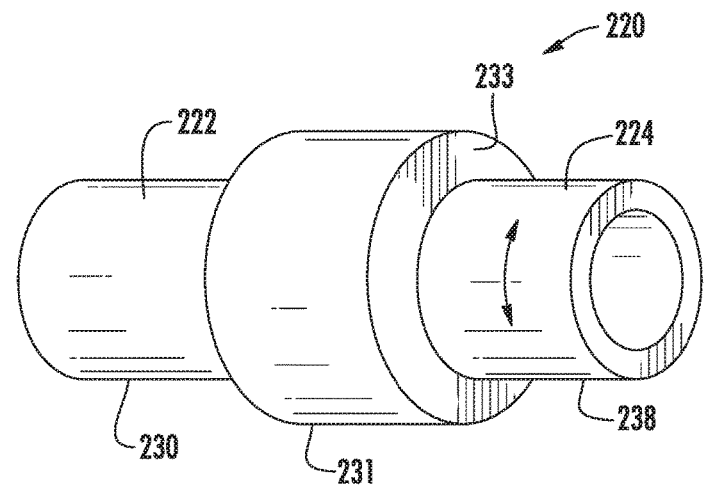
FIG. 9 is an isometric view of another embodiment of a pipe adapter according to certain aspects of the disclosure.
Figure 10:
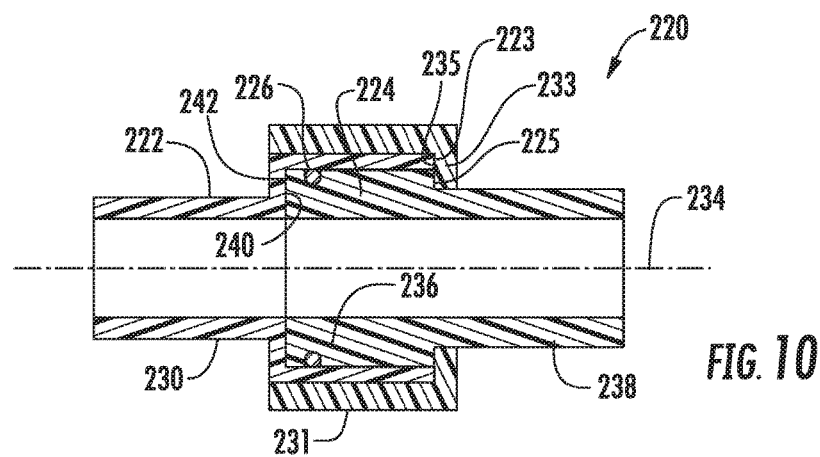
FIG. 10 is a cross-sectional view of the pipe adapter of FIG. 9 taken along line 10-10 in FIG. 9.
Figure 11:
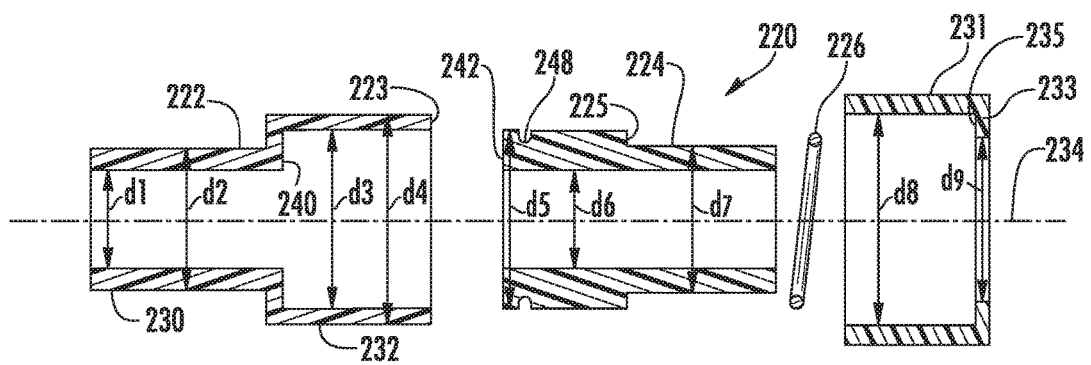
FIG. 11 is an exploded view of the cross-sectional view of FIG. 10.

FIGS. 9-11 show another alternative pipe adapter 220. As shown, pipe adapter 220 includes a first and second tubular elements 222, 224 along a central axis 234. First tubular element first portion 230 and second portion 232 are separated by a radially-extending shoulder 240 and a distal end has a stop 223. First portion 230 has an inner diameter $d_1$ and an outer diameter $d_2$; second portion 232 has an inner diameter $d_3$ and an outer diameter $d_4$. Second tubular element has a first portion 236 and second portion 238, the first portion having a distal end 242 that abuts shoulder 240 and having a radially extending stop 225. First portion 236 has an inner diameter $d_6$ and an outer diameter $d_5$, just smaller than $d_3$; second portion 238 has an inner diameter $d_6$ and an outer diameter $d_7$.

An annular sealing member 226 is located in a channel 248 between first portion 236 of second tubular element 224 and second portion 232 of first tubular element 222 to an axial seal therebetween. Annular sealing member 226 may be, for example, an O-ring or other suitable circular seal allowing rotation between sealed surfaces.

An annular securing member 231 is disposed around and fixed to second portion 232 of the first tubular element 222 for movement therewith. An inner diameter $d_8$ of annular securing member 231 is just larger than $d_4$ of first tubular member 220 so that the parts 222, 224 and 231 can be axially joined as shown in FIG. 10. An adhesive, weld, etc. may be located so as to bond the surfaces defined by $d_4$ and $d_8$. Annular securing member 231 has a flange portion 233 with an inner diameter $d_9$ just larger than $d_7$. Annular securing member 231 also has a surface 235 contacting stops 223,225 to thereby secure second tubular element 224 axially relative to first tubular element 222 while also allowing second tubular element 224 to rotate relative to first tubular element 222 and annular securing member 226.

The structure of FIG. 9-11 could also be described as providing a first tubular element 222 defining a socket ($d_3$), a second tubular element portion ($d_5$) insertable into the socket and defining a radially-extending stop 225. An annular sealing member 226 is located between first and second tubular elements to provide an axial seal therebetween. An annular securing member 231 is disposed around and fixed to a second portion 232 of the first tubular element 220 for movement therewith, the annular securing member 231 having a flange portion 233 contacting stop 225 to secure the second tubular element 224 axially relative to the first tubular element 222 while also allowing the second tubular element to rotate relative to the first tubular element and annular securing member 231.

Figure 12:
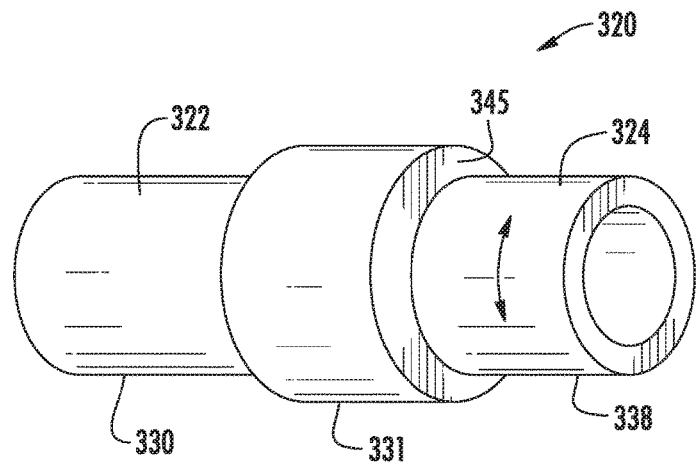
FIG. 12 is an isometric view of another embodiment of a pipe adapter according to certain aspects of the disclosure.
Figure 13:
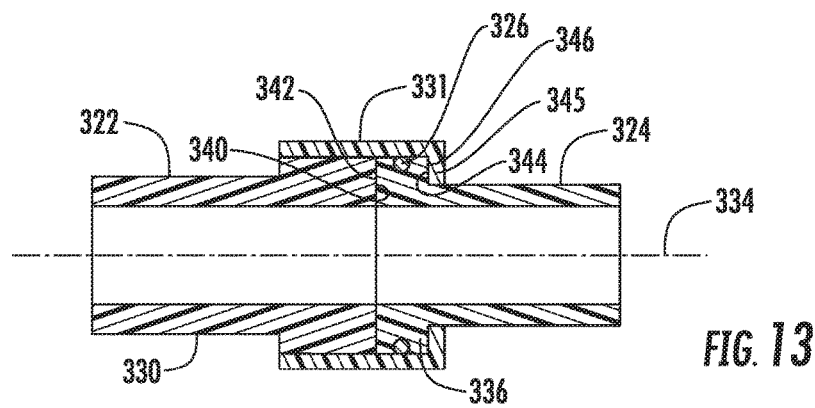
FIG. 13 is a cross-sectional view of the pipe adapter of FIG. 12 taken along line 13-13 in FIG. 12.
Figure 14:
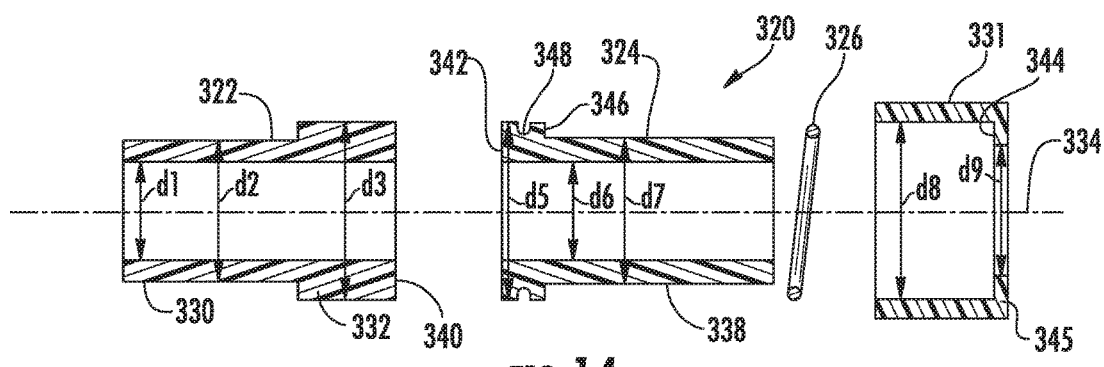
FIG. 14 is an exploded view of the cross-sectional view of FIG. 13.

FIGS. 12-14 show another alternative pipe adapter 320. As shown, pipe 320 adapter includes a first tubular element 322, a second tubular element 324 along a central axis 334. First tubular element 322 has a first portion 330, a second portion 332, and a radially-extending shoulder 340 at the distal end of the second portion. First portion 322 has an inner diameter $d_1$ and an outer diameter $d_2$; second portion 324 has an inner diameter $d_1$ an outer diameter $d_3$. Second tubular element 324 has a first portion 336 and a second portion 338. First portion 336 has an inner diameter $d_6$ substantially equal to $d_1$, and an outer diameter $d_6$ substantially equal to $d_3$. Second tubular element 324 first portion 336 has a distal end 342 that abuts the shoulder 340, and also has a radially-extending stop 346.

An annular securing member 331 is disposed around and fixed to the second portion 332 of the first tubular element 322 for movement therewith. An inner diameter $d_8$ of annular securing member 331 is just larger than $d_3$ and $d_5$ of first and second tubular members 322, 324 so that the parts 322, 324 and 331 can be axially joined as shown in FIG. 13. An adhesive, weld, etc. may be located so as to bond the surfaces defined by $d_3$ and $d_8$. Annular securing member 331 has a flange portion 345 with an inner diameter $d_9$ just larger than $d_7$ and a surface 344 contacting the stop 346 to secure second tubular element 324 axially relative to first tubular element 322 while also allowing second tubular element 324 to rotate relative to first tubular element 322 and annular securing member 331.

An annular sealing member 326, which may be for example an O-ring or other circular seal, is located in a channel 348 between first portion 326 and annular securing member 331 and providing an axial seal therebetween.

The disclosed pipe adapters 20, 120, 220, 320 therefore provide improved efficiency and flexibility in installation of piping systems. The pipe adapters can be mixed and matched with various off the shelf parts, and can be made in various standard and nominal pipe sizes. The pipe adapters can be sold pre-made (with rotatability) or can be sold in kits including parts for one adapter, or in kits including multiple units of each part with multiple optional parts (such as connectors 54-62), and or with straight or angled connector-like parts or pipes with built in sockets 135 like part 122. The rotatable adapters 20, 120, 220, 320 provide relief from stresses and strains caused by seismic activity. Thus, the present disclosure provides a number of different ways in which technicians working in the field can benefit, save time, work though misalignments or changes in the field on the fly, and that can reduce failures in case of seismic activity.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

I claim:

1. A pipe adapter comprising:
   a first tubular element defining a central axis and having a first portion, a second portion axially adjacent the first portion, and a shoulder at the distal end of the second portion, the shoulder extending radially relative to the central axis, the first portion having an inner diameter and an outer diameter, the second portion having an inner diameter substantially equal to the first portion inner diameter and an annular outer surface defined by an outer diameter larger than the first portion outer diameter;
   a second tubular element defining a central axis coaxial with the central axis of the first tubular element and having a first portion and a second portion axially adjacent the first portion, the first portion of the second tubular element having an inner diameter substantially equal to the inner diameter of the second portion of the first tubular member and an outer diameter substantially equal to the outer diameter of the second portion of the first tubular element, the second tubular element first portion having a distal end that abuts the shoulder and that is radially-extending, and having a stop, the stop being radially extending;
   an annular securing member defining a central axis coaxial with the central axis of the first tubular element and having an annular inner surface disposed around and fixed to the annular outer surface of the second portion of the first tubular element for movement therewith, the annular securing member having a flange portion contacting the stop to secure the second tubular element axially relative to the first tubular element while also allowing the second tubular element to rotate relative to the first tubular element and annular securing member, the flange portion being radially extending; and
   an annular sealing member located between the first portion of the second tubular element and annular securing member and providing an axial seal therebetween.

2. The pipe adapter of claim 1, wherein at least one of the first portion of the first tubular element and the second portion of the second tubular element are each sized for attachment to a socket of a respective pipe connector.

3. The pipe adapter of claim 1, wherein at least one of the first portion of the first tubular element and the second portion of the second tubular element are each sized for attachment within an end opening of a respective pipe.

4. The pipe adapter of claim 1, wherein the annular sealing member includes an O-ring.

5. The pipe adapter of claim 1, wherein the first portion of the second tubular element defines a channel for positioning the annular sealing member.

6. A pipe adapter comprising:
   a first tubular element defining a central axis and having a first portion and a second portion axially adjacent the first portion, the second portion having an annular outer surface and defining a distal end, the distal end being radially-extending;
   a second tubular element defining a central axis coaxial with the central axis of the first tubular element and having a first portion and a second portion axially adjacent the first portion, the first portion defining a distal end abutting the distal end of the first tubular element and having a stop, the stop being radially extending;
   an annular securing member defining a central axis coaxial with the central axis of the first tubular element and having an annular inner surface disposed around and fixed to the annular outer surface of the second portion of the first tubular element for movement therewith, the annular securing member having a flange portion contacting the stop to secure the second tubular element axially relative to the first tubular element while also allowing the second tubular element to rotate relative to the first tubular element and annular securing member, the flange portion being radially extending; and
   an annular sealing member located between the first portion of the second tubular element and the annular securing member and providing an axial seal therebetween.

7. The pipe adapter of claim 6, wherein at least one of the first portion of the first tubular element and the second portion of the second tubular element are each sized for attachment to a socket of a respective pipe connector.

8. The pipe adapter of claim 6, wherein at least one of the first portion of the first tubular element and the second portion of the second tubular element are each sized for attachment within an end opening of a respective pipe.

9. The pipe adapter of claim 6, wherein the annular sealing member includes an O-ring.

10. The pipe adapter of claim 6, wherein the first portion of the second tubular element defines a channel for positioning the annular sealing member.

* * * * *